Jan. 9, 1940.    G. A. ILER    2,186,024

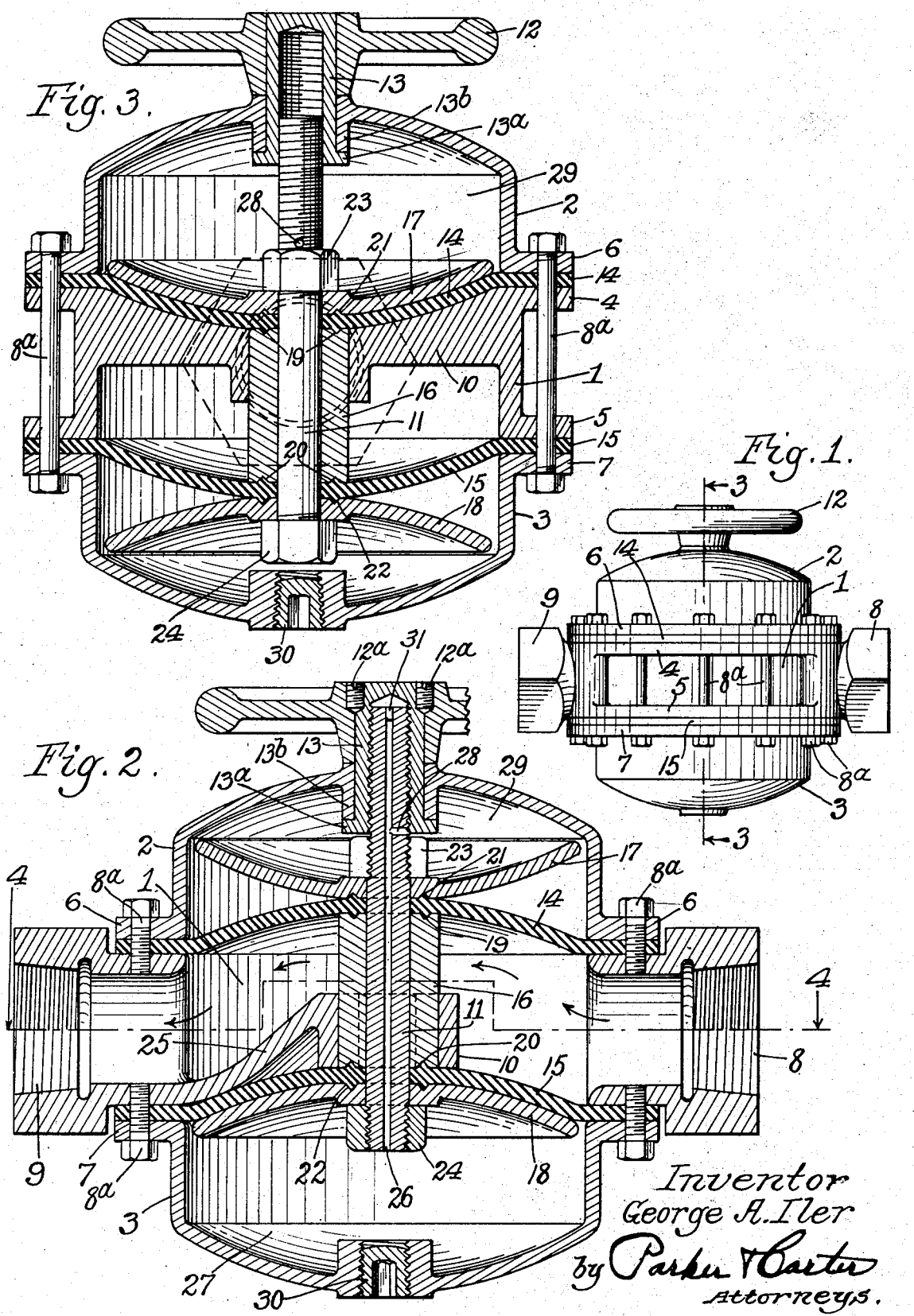

VALVE

Filed June 1, 1937    2 Sheets-Sheet 2

Inventor
George A. Iler
by Parker & Carter
Attorneys.

Patented Jan. 9, 1940

2,186,024

UNITED STATES PATENT OFFICE 2,186,024

VALVE

George A. Iler, Melrose Park, Ill., assignor to The McAlear Manufacturing Company, Chicago, Ill., a corporation of Illinois Application June 1, 1937, Serial No. 145,675

11 Claims. (Cl. 137—153)

This invention relates to valves and has for its object to provide a new and improved device of this description.

The invention has as a further object to provide a substantially balanced diaphragm valve. The invention has as a further object to provide a diaphragm valve which can be effectively and efficiently used with high pressures. The invention has as a further object to provide a diaphragm valve particularly adapted for handling liquids containing abrasive material, dirt and scale. The invention has as a further object to provide a diaphragm valve that has a substantially stream line flow therethrough, so that the direction of flow through the valve is substantially in a forward direction, without any abrupt turns.

The invention has as a further object to provide a diaphragm valve which shall be free from the crowding of the diaphragm in the direction of the flow through the valve while the valve is in its closed position. The invention has as a further object to provide a diaphragm valve that will not be injured by the liquid therein freezing. The invention has further objects which are more particularly pointed out in the accompanying description.

Referring now to the drawings, Fig. 1 is a side elevation of one form of valve embodying the invention;

Fig. 2 is an enlarged vertical section through the valve and the inlet and the outlet, showing the valve in its open position;

Fig. 3 is an enlarged sectional view taken on line 3—3 of Fig. 1, showing the valve in its closed position;

Like numerals refer to like parts throughout the several figures.

Figure 4:
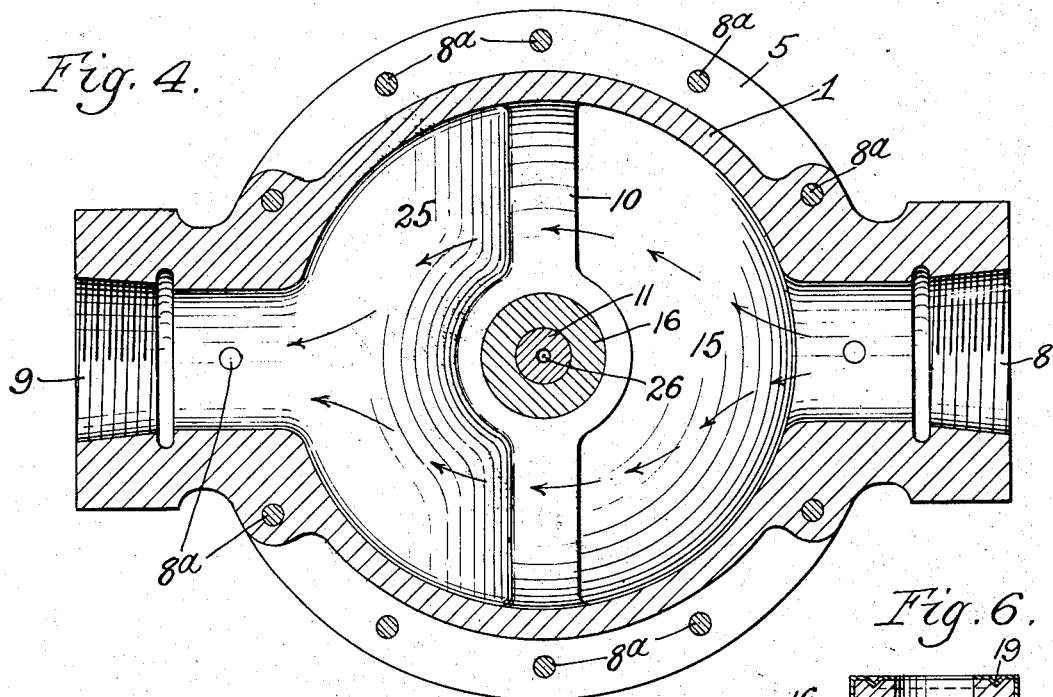
Fig. 4 is an enlarged sectional view taken on line 4—4 of Fig. 2.

I have illustrated in the drawings one form of valve embodying the invention. In this construction the valve has a casing made of three separable parts, a central part 1, and the upper and lower parts 2 and 3. These parts may be connected together in any desired manner, as for example, by means of flanges 4 and 5 on the central section of the casing and 6 and 7 on the upper and lower sections of the casing, the parts being held in position by the fastening devices or bolts 8a. The casing is provided with an inlet 8 and an outlet 9. The central section of the casing is provided with a cross member 10 which has a central opening in which is movably mounted a diaphragm holding member 11, this member being moved up and down through this central opening in any desired manner, either automatically or by hand. In Figs. 1, 2 and 3, for example, the valve is opened and closed by hand by means of a handwheel 12, the hub of which is removably attached to a threaded member 13 by the screws 12a, so that the handwheel and the member 13 will rotate together. The hub of the handwheel engages the upper section of the casing and the member 13 has a flange 13a which engages an inwardly projecting part 13b on the casing, so that the member 13 is held against longitudinal movement but is free to rotate in the casing. The upper end of the member 11 is threaded and fits into the hollow threaded member 13 so that when the handwheel is moved in one direction, the member 11 will move downwardly and when the handwhel is moved in the other direction, the member 11 will move upwardly.

Two flexible diaphragms 14 and 15 are mounted in the casing in any desired manner and extend across the same on opposite sides of the inlet and the outlet. These diaphragms may be held in position in any desired manner, as by being bound between the flanges 4 and 5 of the central portion and 6 and 7 of the upper portion of the casing by means of the fastening devices 8a. There is a spacer 16 between the two diaphragms which spaces and holds them apart and which is located in the central opening of the cross member 10. The cross member 10 acts as a valve seat for the diaphragm 14.

Associated with the diaphragm 14 is a metal disc 17 having a curved face opposed to the diaphragm. Associated with the diaphragm 15 is a similar metal disc 18 with a curved face opposed to the diaphragm 15. The spacer 16 is preferably provided with grooves 19 and 20 and the disc 17 with the groove 21 and the disc 18 with the groove 22. The discs and the diaphragms are held in position on the diaphragm holding member 11 by means of the nuts 23 and 24 located on threaded portions of the member 11. When these nuts are tightened, portions of the flexible or soft diaphragms, which are preferably made of rubber or pliable composition, or the like, are forced into the grooves 19, 20, 21 and 22, as shown in Fig. 2, so as to insure a tight joint between them, which prevents leakage past the diaphragms.

There is an obstructing wall 25 connecting the cross member 10 with the inner wall of the casing so as to form an obstructing wall for preventing the liquid from passing through the valve when the diaphragms are closed. There is a central passageway 26 through the diaphragm holding member 11, one end of which communicates with the space 27 below diaphragm 15. There is a communication 28 between the portion of the passageway 26 above diaphragm 14 and the space 29 above said diaphragm 14 so that as the diaphragms move up and down, air will pass from one space to another so as to relieve any pressure due to the movement of the diaphragms and permit their free unobstructed movement.

There is an opening in the lower section 3 of the casing which when the device is hand operated by the handwheel 12, is closed by a plug 30. When it is desired to operate the valve automatically or from a distant point, this plug is removed and a pipe leading to a source of power supply, which may be a fluid under pressure, is substituted for this plug. Under these conditions the upper end of the passageway 26 is closed by a suitable plug 31. When the valve casing is connected to a source of power supply, the handwheel 12 may be removed.

Figure 6:
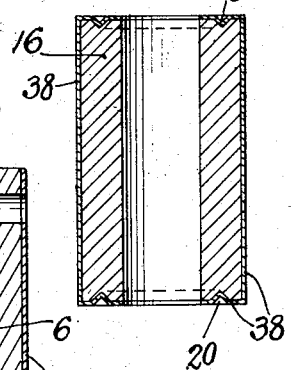
Fig. 6 is a sectional view of a modified form of spacing tube for the diaphragm frame.
Figure 5:
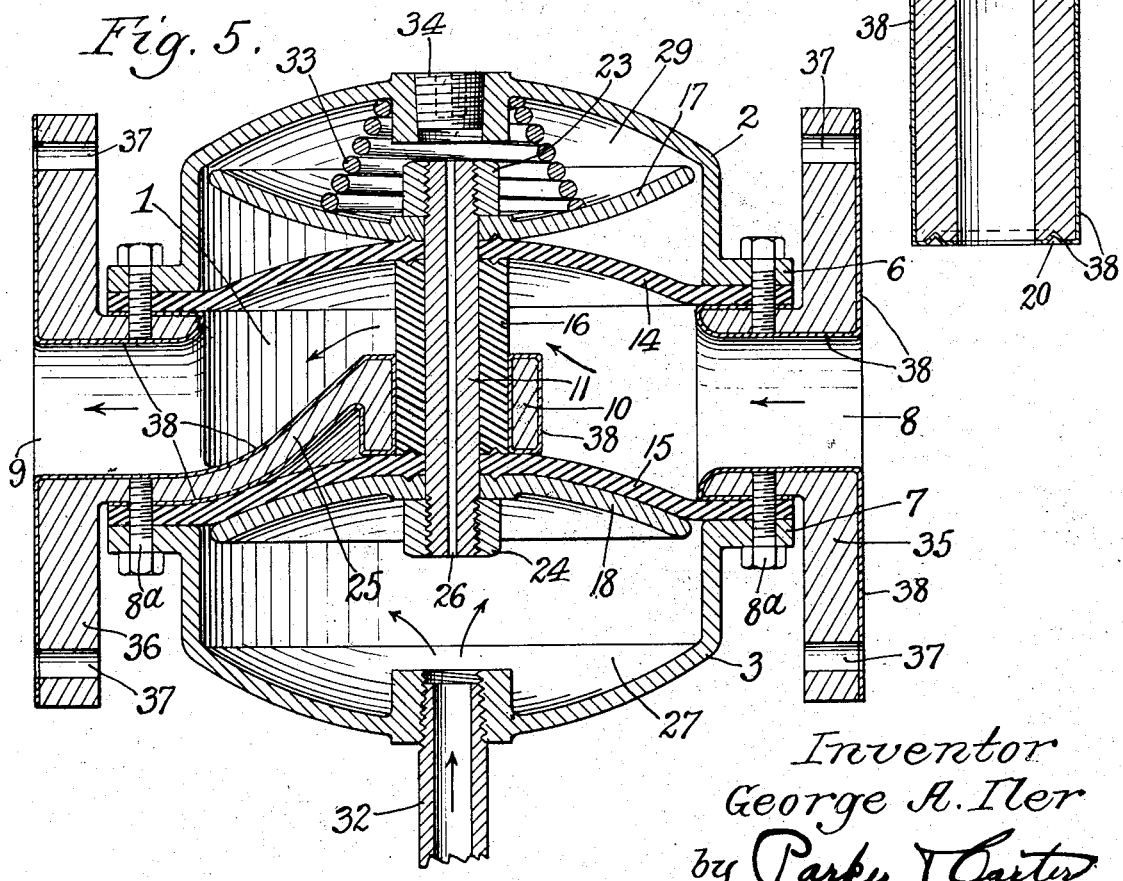
Fig. 5 is a sectional view similar to Fig. 2, showing a modified construction.

In Fig. 5 I have shown a modified construction wherein the parts are similar to those shown in the preceding drawings, except that the chamber 27 is connected to a source of power supply by a suitable pipe or other connection 32. There is located in the upper chamber 29 a retracting device for the diaphragms, such as the spring 33. In this construction, instead of having the central member 11 project through the casing, it is cut off so as to project only into the chamber 29 and there is a plug 34 placed in the opening at the top of the casing. In Figs. 1 to 4, for example, I have shown the inlet and outlet openings as being threaded so that the casing may be connected in the pipe line by means of threaded parts. In Fig. 5 I have illustrated the casing as being provided with flanges 35 and 36 and the casing can be connected in the pipe line by providing similar flanges, the flanges being bolted together by means of bolts passing through the openings 37. If, for example, the valve is to be used in a pipe line through which corrosive material is to be passed, such as acids, the inner faces of the metal parts with which the corrosive material comes into contact may be easily and properly lined with a protective coating by simply removing the upper and lower sections of the casing. This exposes the parts so that they may be easily and quickly properly coated. In Fig. 5, I have shown these parts as being coated with a protective coating 38 which may be porcelain, or enamel, or glass, or rubber, or any proper coating that will protect the metal of the valve from corrosion. The spacer 16 may be made of rubber, as shown Fig. 5, which will resist the corrosive effect of the material, or may be of metal and coated with the proper resistive coating 38, as shown in Fig. 6.

The use and operation of my invention are as follows.

When the valve illustrated in Figs. 1 to 4 is properly connected in the pipe line and the diaphragms are in the position shown in Fig. 3, the valve is closed by the diaphragm 14 engaging the cross member 10, so as to prevent material from passing therethrough. When it is desired to open the valve, the handwheel 12 is rotated and this rotates the hollow internal threaded member 13 which engages the diaphragm holding member 11 and moves it upwardly, thereby moving the diaphragms 14 and 15 upwardly and the discs 17 and 18 upwardly to the position shown in Fig. 2. This opens the valve and the material passes from the inlet 8 through the central section of the casing between the diaphragms 14 and 15, and out the outlet 9. Any of the material that may pass under the cross member 10 will be stopped by the wall 25. It will be seen that the material passing through the valve will be between the diaphragms 14 and 15 and that it will therefore exert a substantially equal pressure on these diaphragms, the pressures being opposed so as to form a balanced construction.

In closing the valve, the handwheel is moved to move the parts so as to move the diaphragm 14 into intimate contact with its seat, being the cross member 10. Since, therefore, the only power required to move the diaphragm is the power required to move the parts, it will be seen that the valve can be easily opened and closed regardless of the pressure of the material passing through the valve. In previous diaphragm valves, particularly where the diaphragms are large and the pressure of the material passing through the valve is comparatively high, it is very difficult to operate the valve against this pressure and this has limited the scope of these valves very greatly.

When the diaphragms are moved upwardly, the air in the chamber 29 passes through the opening 28 and then through the passageway 26 into the chamber 27. When the diaphragms are moved downwardly to the closing position, the air in the chamber 27 moves up through the passageway 26 and out the opening 28 in the chamber 29. It will therefore be seen that all air resistance to the movement of the valve is therefore eliminated.

In the construction shown in Fig. 5, the pipe 32 is connected to some source of power, which may be fluid under pressure, and when it is desired to open the valve, this fluid is permitted to enter the chamber 27 and the pressure exerted on the disc 18 causes the parts to be moved up to the position shown in Fig. 5. This pressure is held until it is desired to close the valve. When it is desired to release it, the retracting device or spring 33 moves the parts downwardly so as to cause the diaphragm 14 to engage the cross member 10 and close the valve. The passageway 26 causes an equalization of the pressure in the two chambers 27 and 29 so as to insure the valve being properly balanced.

This valve, in addition to its other advantages, is well adapted for handling liquids containing abrasive material, dirt and scale, as there is a substantially stream line or straight flow through the valve. Furthermore, the diaphragm is not required to be moved into such abrupt curved positions, as has heretofore been necessary, and this prevents injury to the diaphragm. The spacer 16, being located at the center of the diaphragms and to which the center of the diaphragms are secured, prevents lateral motion of the diaphragms due to the flow of the material through the valve and this is an important feature of the device. I have also proven that the valve will not be damaged by filling it with water and freezing it solidly.

The discs 17 and 18 have smooth surfaces exposed to the diaphragms and this prevents the diaphragms from being bruised or any impression being made thereon when the valve is operated. The material may flow through the valve in either direction, but it should preferably flow from the inlet 8 to the outlet 9.

I claim:

1. A valve comprising a cylindrical casing, two flexible diaphragms extending across said casing, dividing it into three chambers, a central chamber and two end chambers, all of said chambers being of substantially the same diameter, the end chambers being closed against communication with the outside atmosphere, the casing having an inlet and an outlet communicating with the central chamber between the diaphragms, so that the material passing through the valve exerts pressure in opposite directions on the diaphragms, a seating member in the central chamber for one of said diaphragms, having a curved upper face with which the diaphragm makes contact, and means for moving said diaphragms so as to move one of them into contact with the curved face of the seating member to close the valve.

2. A valve comprising a casing, two flexible diaphragms extending across said casing, dividing it into three chambers, a central chamber and two end chambers, the casing having an inlet and an outlet communicating with the central chamber between the diaphragms, so that the material passing through the valve exerts pressure in opposite directions on the diaphragms, a seating member extending entirely across the central chamber substantially at right angles to the direction of flow of the material passing through said central chamber and having a curved upper face against which one of said diaphragms makes contact, said latter diaphragm acting as a diaphragm and also as a valve, means for moving said diaphragms so as to move one of them into contact with the seating member to close the valve, a disc on the other side of said latter diaphragm, said latter diaphragm being clamped between said disc and sealing member when in its closed position.

3. A valve comprising a casing, two flexible diaphragms extending across said casing, dividing it into three chambers, a central chamber and two end chambers the end chambers being closed against communication with the outside atmosphere, the casing having an inlet and an outlet communicating with the central chamber between the diaphragms, so that the material passing through the valve exerts pressure in opposite directions on the diaphragms, a seating member in the central chamber for one of said diaphragms, means for moving said diaphragms so as to move one of them into contact with the seating member to close the valve and means forming a part of the movable valve structure, for equalizing the pressure in the two end chambers when the diaphragms are moved.

4. A valve comprising a casing, two flexible diaphragms extending across said casing, dividing it into three chambers, a central chamber and two end chambers the end chambers being closed against communication with the outside atmosphere, the casing having an inlet and an outlet communicating with the central chamber between the diaphragms, so that the material passing through the valve exerts pressure in opposite directions on the diaphragms, a seating member in the central chamber for one of said diaphragms, said seating member extending across the central chamber substantially at right angles to the passageway therethrough for the material, means for moving said diaphragms so as to move one of them into contact with the seating member to close the valve, metal discs associated with each diaphragm, and means independent of said metal discs for preventing lateral movement of the diaphragms due to the flow of the material between them.

5. A valve comprising a casing, two flexible diaphragms extending across said casing, dividing it into three chambers, a central chamber and two end chambers, the casing having an inlet and an outlet communicating with the central chamber between the diaphragms, so that the material passing through the valve exerts pressure in opposite directions on the diaphragms, a seating member in the central chamber for one of said diaphragms, means for moving said diaphragms so as to move one of them into contact with the seating member to close the valve a centrally connecting member connecting the diaphragms together and, a spacer member separate from and shorter than said connecting member between the two diaphragms and surrounding the central connecting member and means for clamping them against the ends of said spacer member.

6. A valve comprising a casing, two flexible diaphragms extending across said casing, dividing it into three chambers, a central chamber and two end chambers, the casing having an inlet and an outlet communicating with the central chamber between the diaphragms, so that the material passing through the valve exerts pressure in opposite directions on the diaphragms, a seating member in the central chamber for one of said diaphragms, means for moving said diaphragms so as to move one of them into contact with the seating member to close the valve, a centrally located diaphragm holding member extending through the central portion of the diaphragms, a spacer separate from and shorter than said diaphragm holding member between the diaphragms having one end engaging each diaphragm and means associated with the diaphragm holding member for pressing the diaphragms against the spacer.

7. A valve comprising a metal casing and three separable sections, a central section and two end sections, the end sections being separated from the central section by two opposed diaphragms, the central section constituting a direct crosswise passageway for the material from the inlet to the outlet, a cross member in the central section having a metal face against which one of the diaphragms contacts, the cross member and the metal walls of the central section being lined with non-corrosive material.

8. A valve comprising a casing, two flexible diaphragms extending across said casing, dividing it into three chambers, a central chamber and two end chambers the end chambers being closed against communication with the outside atmosphere, the casing having an inlet and an outlet communicating with the central chamber between the diaphragms, so that the material passing through the valve exerts pressure in opposite directions on the diaphragms, a seating member in the central chamber for one of said diaphragms, extending across the central chamber in a direction substantially at right angles to the passageway therethrough for the material, means for moving said diaphragms so as to move one of them into contact with the seating member to close the valve, a centrally located diaphragm holding member extending through the central portion of the diaphragms and a communication between the two end chambers extending through said centrally located diaphragm-holding member, which causes the pressure in the two end chambers to be equalized as the diaphragms are moved.

9. A valve comprising a cylindrical casing, two flexible diaphragms extending across said casing, dividing it into three chambers, a central chamber and two end chambers, all of said chambers being of substantially the same diameter, the casing having an inlet and an outlet communicating with the central chamber between the diaphragms, so that the material passing through the valve exerts pressure in opposite directions on the diaphragms, a seating member in the central chamber and extending from one side thereof to the other for one of said diaphragms, having a curved upper face with which the diaphragm makes contact, an obstructing wall connected with said seating member and also connecting with the outer wall of the central section of the casing, and means for moving said diaphragms so as to move one of them into contact with the curved face of the seating member to close the valve.

10. A valve comprising a casing, two flexible diaphragms extending across said casing, dividing it into three chambers, a central chamber and two end chambers the end chambers being closed against communication with the outside atmosphere, the casing having an inlet and an outlet communicating with the central chamber between the diaphragms, so that the material passing through the valve exerts pressure in opposite directions on the diaphragms a passage extending through both of said diaphragms and connecting the end chambers together, a seating member in the central chamber for one of said diaphragms, pressure actuating means controlled from a distant point for moving said diaphragma so as to open the valve and a retracting device for moving the diaphragms to close the valve.

11. A valve comprising a casing, two flexible diaphragms extending across said casing, dividing it into three chambers, a central chamber and two end chambers the end chambers being closed against communication with the outside atmosphere, the casing having an inlet and an outlet communicating with the central chamber between the diaphragms, so that the material passing through the valve exerts pressure in opposite directions on the diaphragms a passage extending through both of said diaphragms and connecting the end chambers together, a seating member in the central chamber for one of said diaphragms, means controlled from a distant point for applying pressure to one of said end chambers to move the diaphragms in one direction, and separate means for moving the diaphragms in the other direction.

GEORGE A. ILER.